(12) United States Patent
Thronicke

(10) Patent No.: US 11,983,861 B2
(45) Date of Patent: May 14, 2024

(54) SYSTEM AND METHOD FOR EXAMINING OBJECTS FOR ERRORS

(71) Applicant: Atos Information Technology GmbH, Munich (DE)

(72) Inventor: Wolfgang Thronicke, Salzkotten (DE)

(73) Assignee: BULL SAS, Les Clayes sous Bois (FR)

( * ) Notice: Subject to any disclaimer, the term of this patent is extended or adjusted under 35 U.S.C. 154(b) by 254 days.

(21) Appl. No.: 17/329,053

(22) Filed: May 24, 2021

(65) Prior Publication Data

US 2021/0374945 A1  Dec. 2, 2021

(30) Foreign Application Priority Data

May 29, 2020  (EP) ..................................... 20177525

(51) Int. Cl.
*G06T 7/00* (2017.01)
*B64C 39/02* (2023.01)
(Continued)

(52) U.S. Cl.
CPC .......... *G06T 7/0006* (2013.01); *B64C 39/024* (2013.01); *G06T 7/74* (2017.01);
(Continued)

(58) Field of Classification Search
CPC ....... G06T 7/74; G06T 7/0006; G06T 7/0004; G06T 2207/20084; G06T 2207/30184;
(Continued)

(56) References Cited

U.S. PATENT DOCUMENTS

2019/0368133 A1* 12/2019 Joshi .......................... G06T 7/11
2020/0279367 A1* 9/2020 White ................... G05D 1/0094
(Continued)

FOREIGN PATENT DOCUMENTS

CN  110261394 A  *  9/2019  ........... B64C 39/024
CN  110751270 A  *  2/2020

OTHER PUBLICATIONS

European Search Report issued in EP20177525.1 on Nov. 9, 2020 (9 pages).
(Continued)

*Primary Examiner* — Vu Le
*Assistant Examiner* — Tracy Mangialaschi
(74) *Attorney, Agent, or Firm* — ARC IP Law, PC; Joseph J. Mayo

(57) ABSTRACT

A system (1) for examining an object (2) for errors comprises a monitoring device (3), a processing module (5), a capturing device (4) and a recognition module (6). The monitoring device (3) is designed to monitor at least one parameter. A specified range of the parameter defines a context within which a result of a recognition of at least parts of the object (2) is expected. The processing module (5) is designed to prove whether the monitored parameter is within the specified range and in this case to trigger the capturing device (4) which is designed to capture input data associated with the object (2). The recognition module (6) is pre-trained for recognizing the object (2) and to perform the recognition based on the input data. The recognition module (6) is designed to detect an error if a result of the recognition is not corresponding to the expected result.

9 Claims, 3 Drawing Sheets

(51) Int. Cl.
    *G06T 7/73*      (2017.01)
    *B64U 101/30*    (2023.01)
(52) U.S. Cl.
    CPC    *B64U 2101/30* (2023.01); *G06T 2207/10032*
           (2013.01); *G06T 2207/20084* (2013.01); *G06T*
                                    *2207/30184* (2013.01)
(58) Field of Classification Search
    CPC . G06T 2207/10032; G06T 2207/20081; G06T
                 2207/30132; B64C 39/024; B64U
                            2101/30; Y02B 10/30
    See application file for complete search history.

(56)                References Cited

U.S. PATENT DOCUMENTS

2020/0401163 A1*  12/2020  Inoshita ................ B64C 39/024
2020/0402220 A1*  12/2020  Dong .................... H04N 23/54

OTHER PUBLICATIONS

Hallermann, et al., "Visual Inspection Strategies for Large Bridges using Unmanned Aerial Vehicles (UAV)", IABMAS 2014, Jul. 11, 2014; pp. 1-7.
Denhof, et al., "Automatic Optical Surface Inspection of Wind Turbine Rotor Blades Using Convolutional Neural Networks", Procedia Cirp, vol. 81, Jan. 1, 2019, pp. 1166-1170.
Stetco, et al., "Machine Learning Methods for Wind Turbine Condition Monitoring: A Review", Renewable Energy, Pergamon Press, Oxford, vol. 133, Oct. 9, 2018.

* cited by examiner

SYSTEM AND METHOD FOR EXAMINING OBJECTS FOR ERRORS

This application claims foreign priority to European Patent Application No. 20177525.1, filed 29 May 2020, the specification of which is hereby incorporated herein by reference.

BACKGROUND OF THE INVENTION

Field of the Invention

The present invention relates to a system and a method for examining objects for errors.

Description of the Related Art

A technical problem in using machine-learning based recognition methods to detect errors, anomalies and other deviations associated with objects consists in training a machine learning system to recognize the errors as such a system suffers from unexpected/untrained events that can occur. A system trained for a given set of errors, e.g. a neuronal network, will therefore fail when unexpected/untrained events occur. With the complexity of the errors the use of trained networks becomes a challenge if the error detection has to be done with a restricted inspection device. Also the time to train for errors and the amount of data for every erroneous situation requires a lot resources until the neuronal network can be deployed and still untrained errors may not be detected. The training of all possible errors is very resource-consuming and may be even impossible.

BRIEF SUMMARY OF THE INVENTION

One objective of the present invention is to provide an improved system and an improved method for examining an object for errors. This objective is solved by a system and a method for examining an object for errors with the features of the independent claims, respectively. Advantageous embodiments are specified within the dependent claims.

A system for examining at least one object for errors comprises a monitoring device, a processing module, a capturing device and a recognition module. The monitoring device is designed to monitor at least one parameter. A specified range of the parameter defines a context within which a result of a recognition of at least parts of the object is expected. The processing module is designed to prove whether the monitored parameter is within the specified range and in this case to trigger the capturing device. The capturing device is designed to capture input data associated with at least parts of the object. The recognition module is pre-trained for recognizing at least parts of the object and to perform the recognition of at least parts of the object based on the input data. The recognition module is designed to detect an error if a result of the recognition is not corresponding to the expected result.

The system is based on the idea that in real scenarios a context can be used for the recognition. Also, there is an expected recognition result which is linked to the context. This context is given by the specified range of the parameter. Advantageously, performing the recognition within the context enables an efficient detection of errors associated with the object.

Also, there is no need to train the recognition module for all potential situations and errors which may occur. A training time may thus be reduced, advantageously. Furthermore, the necessity to provide training data for a plurality of errors is avoided.

As the training of the recognition module is kept simple and smaller than a complex training, the system can run on edge devices or devices with limited computing capacity. Thus, the system can be part of a mobile apparatus.

In an embodiment the monitoring device is designed to monitor a location of the system. The recognition module is designed to detect an error if the system is within a specified region of the object and a result of the recognition is not corresponding to the expected result.

In this case the location of the system represents the parameter. The specified region of the object represents the context. Advantageously, the object is only expected to be present, if the system is within the specified region of the object. If the pre-trained recognition module is not able to detect the object or at least parts of the object although the system is within the specified region it is assumed that an error is present associated with the object which represents an unexpected event for the recognition module as it has not been trained for.

In an embodiment the monitoring device is designed to monitor an orientation of the capturing device. The recognition module is designed to detect an error if the capturing device is oriented according to a specified orientation range with respect to the object and a result of the recognition is not corresponding to the expected result.

In this embodiment case the orientation of the capturing device represents the parameter. The specified orientation range of the object represents the context. Advantageously, the object or at least parts of the object can only be captured, if the capturing device is oriented according to the specified orientation range with respect to the object. If the pre-trained recognition module is not able to detect the object or at least parts of the object although the capturing device is oriented according to the specified orientation range it is assumed that an error is present associated with the object.

In an embodiment the monitoring device is designed to monitor a time as the parameter. The recognition module is designed to detect an error if the recognition module is performing the recognition within a specified time slot representing the context and a result of the recognition is not corresponding to the expected result.

Advantageously, the object or at least parts of the object can only be captured, if the recognition module is performing the recognition within the specified time slot. If the pre-trained recognition module is not able to detect the object or at least parts of the object although the recognition module is performing the recognition within the specified time slot it is assumed that an error is present associated with the object.

In an embodiment the system comprises a communication module designed to transmit the input data to a controlling station if an error is detected. Advantageously, the handling of unexpected situations and errors is deferred.

In an embodiment the system comprises a plurality of error modules. Each error module is pre-trained for a recognition of a specific error. The system is designed to perform an error recognition by triggering the error modules sequentially.

Advantageously, the system can be designed to trigger a certain error module which is trained for the recognition of a specific error which is occurring most frequently compared to other known errors, first. Thus, an efficient error recognition is enabled. Also, the system can be expanded by adding further error modules, e.g. after the appearance of new types of errors.

A mobile apparatus comprises a system for examining at least one object for errors according to one of above describe embodiments.

In an embodiment the mobile apparatus is a drone. The capturing device is a camera. The recognition module is a neuronal network pre-trained for recognizing at least one intact wind turbine based on at least one image captured by the camera. The monitoring device is designed to monitor a location of the drone and an orientation of the camera. The recognition module is designed to detect an error if the drone is within a specified region of the wind turbine, the camera is oriented according to a specified orientation range with respect to the wind turbine and a result of the recognition is not corresponding to the expected result of at least one intact wind turbine.

A method for examining at least one object for errors comprises the following steps. At least one parameter is monitored. A specified range of the parameter defines a context within which a result of a recognition of at least parts of the object is expected. It is proved whether the monitored parameter is within the specified range. Input data associated with at least parts of the object are captured if the parameter is within the specified range. A recognition of at least parts of the object is performed based on the input data. An error is detected if a result of the recognition is not corresponding to the expected result.

BRIEF DESCRIPTION OF THE DRAWINGS

In the following, the invention is described in connection with schematic figures, wherein.

DETAILED DESCRIPTION OF THE INVENTION

Figure 1:
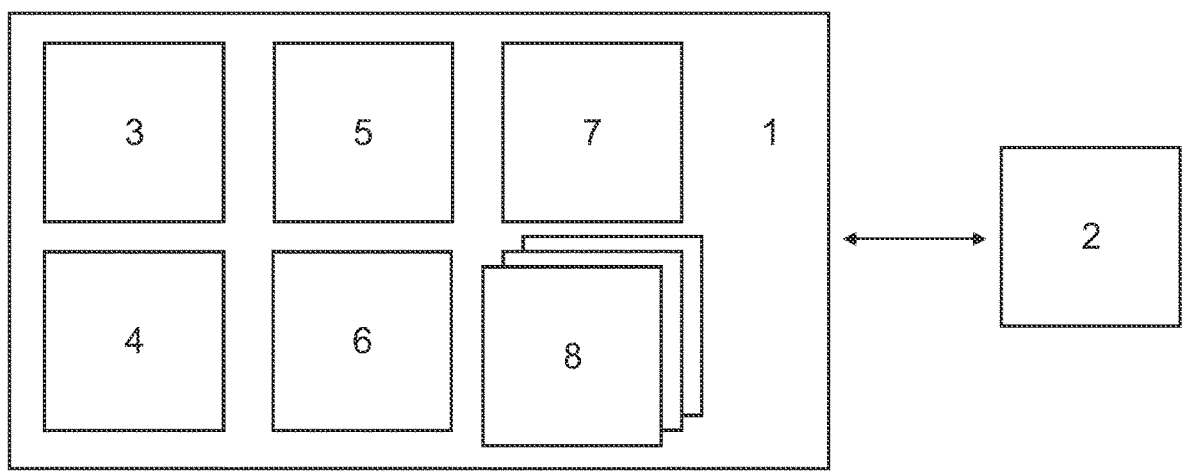
FIG. 1 shows a system for examining at least one object for errors.

FIG. 1 schematically shows a system 1 for examining at least one object 2 for errors.

The object 2 may be any apparatus or any system, e.g. the object 2 can be a wind turbine. However, the object 2 can also e.g. be any industrial production facility and/or industrial product or e.g. a building. There may be different errors associated with the object 2, e.g. mechanical damages and/or other technical failures may occur. An error can also consist in another undesirable condition of the object 2, e.g. an error can consist in a delayed arrival of a product.

The system 1 can e.g. be part of a mobile apparatus. The system can e.g. be part of a vehicle or a drone which can be used for the purpose of the detection of errors associated with the object 2. However, the system 1 may be also part of an immobile apparatus, e.g. a stationary surveillance system.

The system 1 comprises a monitoring device 3. The monitoring device 3 is designed to monitor at least one parameter. A specified range of the parameter defines a context within which a result of a recognition of at least parts of the object 2 is expected. The context can be used for the recognition as there is an expected recognition result which is linked to the context given by the specified range of the parameter.

In one embodiment the monitoring device 3 is designed to monitor a location of the system 1. For this, the monitoring device 3 can be a positioning and navigation system, e.g. a GPS based system. In this case, the context is given by a specified region of the object 2, i.e. the object 2 is expected to be present within the specified region. However, depending on the object 2 to be examined the capturing device 4 may also be another sensor.

Alternatively or additionally, the monitoring device 3 is designed to monitor a time. In this case, the context is given by a specified time slot, e.g. within which a certain event is expected, e.g. the arrival of the object 2. If the object 2 is a wind turbine the context may be given by a time slot within which win conditions allow for proper and efficient operation.

Alternatively or additionally, the monitoring device 3 is designed to monitor an orientation of a capturing device 4 of the system 1. The capturing device 4 is designed to capture input data associated with at least parts of the object 2. The capturing device 4 can e.g. be a camera designed to provide images and videos of the object 2.

The system 1 comprises a processing module 5 designed to prove whether the monitored parameter is within the specified range. If this is the case, the processing module 5 is designed to trigger the capturing device 4 to capture the input data associated with the object 2. E.g. the capturing device 4 captures images and/or videos of the object 2.

For the examination of the object 2 for errors, the system 1 comprises a recognition module 6. The recognition module 6 comprises a machine learning based algorithm, e.g. a neuronal network. For the purpose of recognition based on images, e.g. deep convolutional neuronal networks may be used. The recognition module 6 is pre-trained for recognizing at least parts of the object 2 and to perform the recognition of at least parts of the object 2 based on the input data captured and provided by the capturing device. The input data may be adapted prior to the recognition process. E.g. an image may be adapted to a neuronal network by scaling the image to a size which is compatible with the neuronal network.

The recognition module 6 is designed to detect an error based on the input data if a result of the recognition is not corresponding to the expected result. E.g. the recognition module 6 is designed to detect an error if the system 1 is within a specified region of the object 2 and a result of the recognition is not corresponding to the expected result. Also, the recognition module 6 can be designed to detect an error if the capturing device 4 is oriented according to a specified orientation range with respect to the object 2 and a result of the recognition is not corresponding to the expected result. Furthermore, the recognition module 6 can be designed to detect an error if the recognition module 6 is performing the recognition within a specified time slot and a result of the recognition is not corresponding to the expected result.

Performing the recognition within the context enables an efficient detection of errors associated with the object 2. Also, there is no need to train the recognition module for all potential situations and errors which may occur, whereby a training time may be reduced. Furthermore, the necessity to provide training data for a plurality of errors is avoided. As the training of the recognition module 6 is kept simple and smaller than a complex training, the system 1 can run on edge devices or devices with limited computing capacity. Thus, the system 1 can be part of a mobile apparatus.

Optionally, the system 1 may also comprise a communication module 7. The communication module 1 can be designed to transmit information about detected errors and/or the captured input data to a controlling station for further examination.

Additionally, the system 1 can comprise a plurality of error modules 8. Each error module comprises a machine learning based algorithm, e.g. a neuronal network, which is pre-trained for a recognition of a specific error. The system 1 is designed to perform an error recognition by triggering the error modules 8 sequentially. The error modules 8 can be triggered by the processing module 5 after the recognition module 6 has detected an error. If a first error module detects its error type, information about the error can be transmitted to the controlling station, too. If the first error module fails to recognize the error it has been trained for, a second error module is triggered to perform its own error recognition. Thus, an efficient error recognition is enabled.

Figure 2:
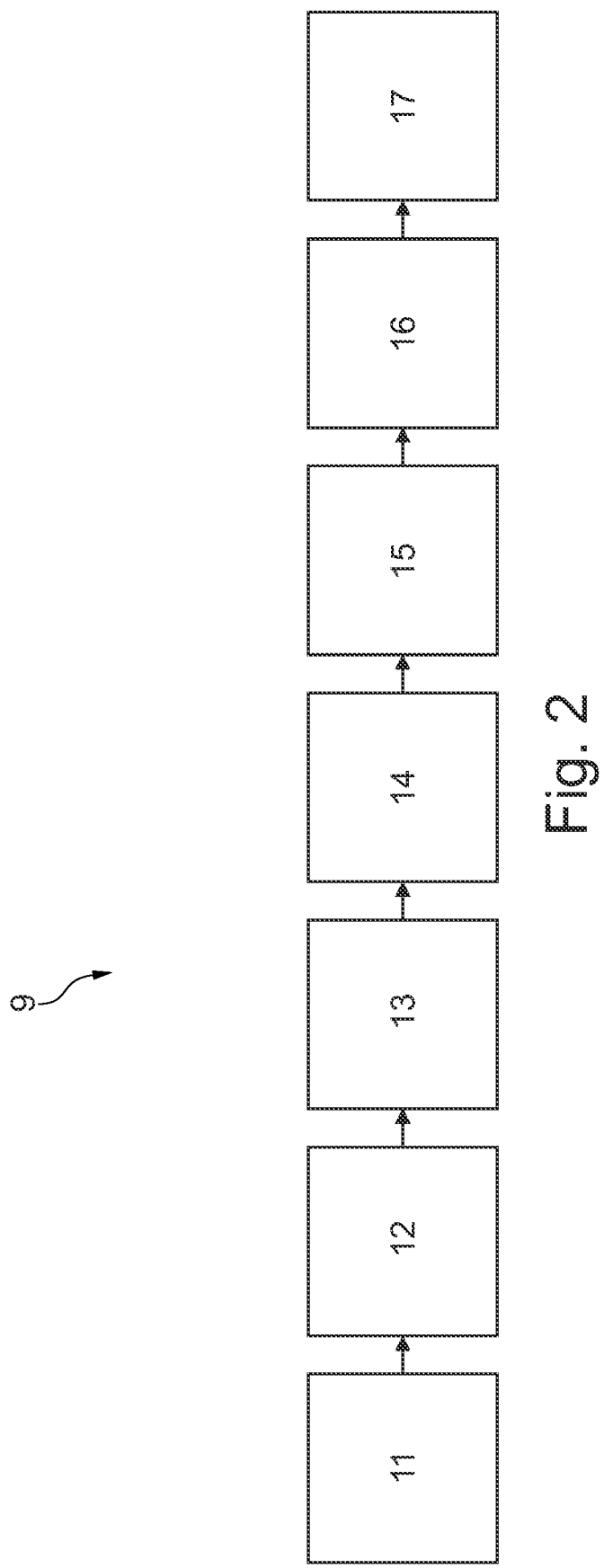
FIG. 2 shows a method for examining at least one object for errors.

FIG. 2 schematically shows method steps 11, 12, 13, 14, 15, 16, 17 of a method 9 for examining at least one object 2 for errors.

In a first method step 11 of the method 9 the at least one parameter is monitored. The specified range of the parameter defines the context within which a result of a recognition of at least parts of the object is expected. In a second method step 12 it is proved whether the monitored parameter is within the specified range. In a third method step 13 the input data associated with at least parts of the object 2 is captured if the parameter is within the specified range. In a fourth method step 14 the recognition of at least parts of the object 2 is performed based on the input data. In a fifth method step 15 an error is detected if a result of the recognition is not corresponding to the expected result.

Optionally, the method may also comprise a sixth step 16 within which information about detected errors and/or the captured input data are transmitted to a controlling station for further examination. In another optional seventh method step 17 an error recognition is performed by triggering the error modules 8 sequentially.

Figure 3:
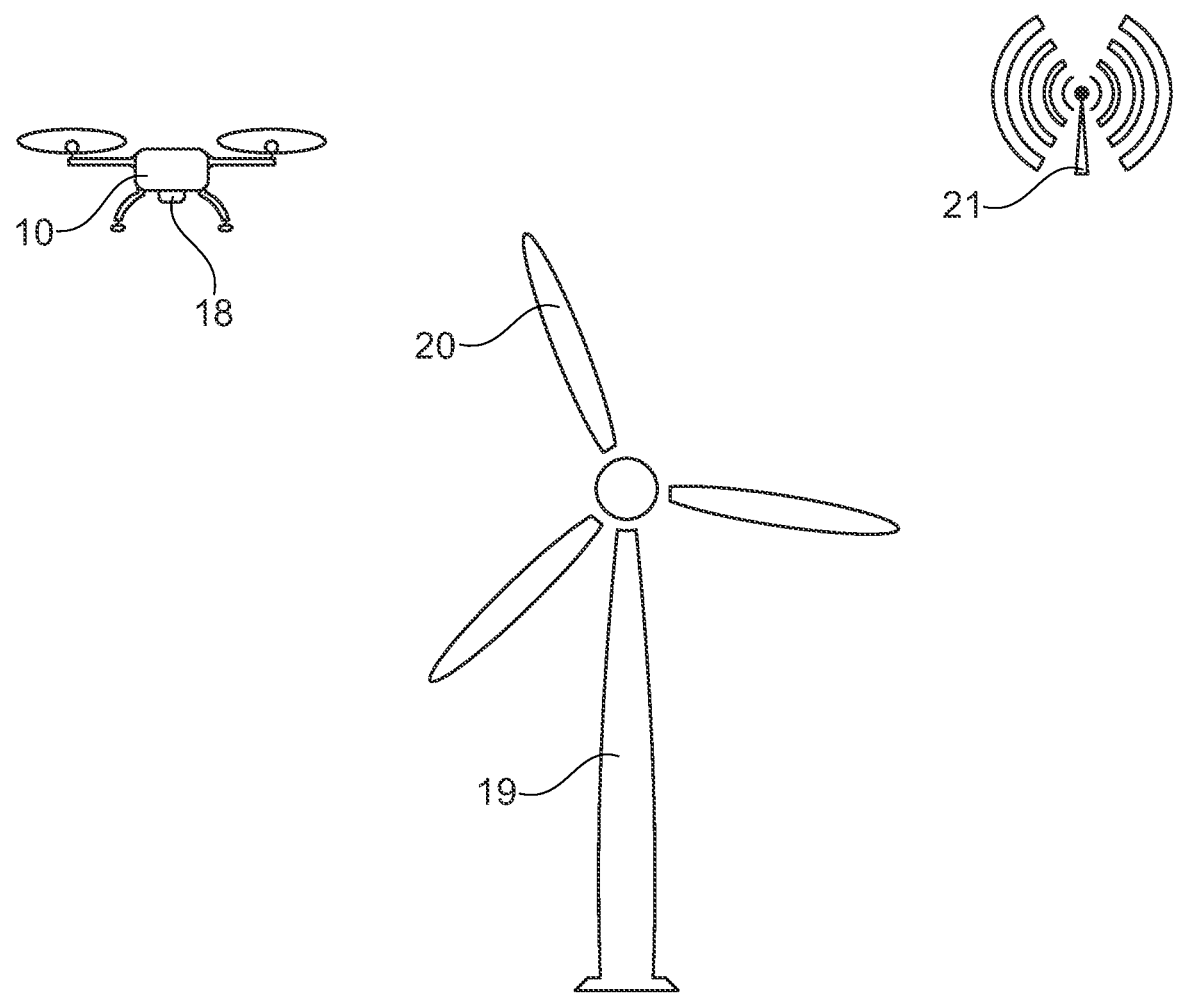
FIG. 3 shows an exemplary embodiment of the system.

FIG. 3 schematically shows an exemplary embodiment of the system 1 and an exemplary object 2 which shall be examined for errors.

The system 1 is part of a drone 10. The capturing device 4 is a camera 18 designed to capture images. The recognition module 6 which is not shown in FIG. 3 is a neuronal network pre-trained for recognizing at least one intact wind turbine 19 based on at least one image captured by the camera 18. The monitoring device 3 is designed to monitor a location of the drone 10 and an orientation of the camera 18. The recognition module 6 is designed to detect an error if the drone 10 is within a specified region of the wind turbine 19, the camera 18 is oriented according to a specified orientation range with respect to the wind turbine 19 and a result of the recognition is not corresponding to the expected result of at least one intact wind turbine 19.

E.g. the recognition module 6 can be pre-trained for detecting a wind turbine 19 only if no parts of the wind turbine 19 are missing. If e.g. a blade 20 of the wind turbine 19 is missing, the recognition module 6 is not able to detect the wind turbine 19 as such. In this case, an error can be detected if the recognition is performed within the context given by the specified region of the wind turbine 19 and the specified orientation range with respect to the wind turbine 19 and a result of the recognition is not corresponding to the expected result of at least one intact wind turbine 19. The recognition module 6 e.g. may also be pre-trained for recognizing a proper operation of the wind turbine 19 within a specified time slot, e.g. when wind conditions are expected to enable an efficient operation of the wind turbine.

The system 1 may also comprise error modules 8 not shown in FIG. 3 to perform an error recognition. E.g. one error module may be pre-trained for recognizing a wind turbine 19 with at least one missing blade 20. Another error module 8 may be pre-trained to differentiate wind turbines 19 which are in operation from those which are not, e.g. due to bad wind conditions.

Information about a detected error can be sent to the controlling station 21 for further examination of the error. Also, information about recognized types of errors may be sent to the controlling station 21 in order to initiate a maintenance.

LIST OF REFERENCE NUMERALS

1 system for examining at least one object for errors
2 object
3 monitoring device
4 capturing device
5 processing module
6 recognition module
7 communication module
8 error module
9 method for examining at least one object for errors
10 drone
11 first method step
12 second method step
13 third method step
14 fourth method step
15 fifth method step
16 sixth method step
17 seventh method step
18 camera
19 wind turbine
20 blade of the wind turbine
21 controlling station

What is claimed is:

1. A system for examining at least one object for errors comprising:
   a monitoring device,
   a processing module,
   a capturing device and
   a recognition module,
   wherein the monitoring device is configured to monitor at least one parameter,
   wherein the at least one parameter includes a location of the system,
   wherein the at least one parameter is associated with a respective predetermined range that is representative of a situation where a predetermined result of a recognition of at least parts of the at least one object is expected,
   wherein the processing module is configured to
      compare a current value of the at least one parameter that has been monitored with the respective predetermined range,
      determine, based on a result of the compare, whether the current value of the at least one parameter that has been monitored is within the respective predetermined range, and
      when it has been determined that the current value of the at least one parameter that has been monitored is within the respective predetermined range, trigger the capturing device,
   wherein, as a response to the trigger, the capturing device is configured to capture input data associated with said at least parts of the at least one object, wherein the recognition module is pre-trained
  to recognize said at least parts of the at least one object,
    wherein the recognition includes one or more of
      determining if said at least parts of the at least one object are present,
      determining proper operation of the at least one object within a specified time slot, and
  to perform the recognition of said at least parts of the at least one object based on the input data,
wherein the recognition module is further configured
  to compare a result of the recognition with the predetermined result that is expected corresponding to the respective predetermined range associated with the at least one parameter that has been monitored, and
to detect an error if the result of the recognition does not correspond to the predetermined result that is expected.

2. The system according to claim 1,
wherein the monitoring device is further configured to monitor a location of the system,
wherein the recognition module is further configured to detect an error if the system is within a predetermined region of the at least one object and the result of the recognition does not correspond to the predetermined result that is expected.

3. The system according to claim 1,
wherein the monitoring device is further configured to monitor an orientation of the capturing device,
wherein the recognition module is further configured to detect an error if the capturing device is oriented according to a predetermined orientation range with respect to the at least one object and the result of the recognition does not correspond to the predetermined result that is expected.

4. The system according to claim 1,
wherein the monitoring device is further configured to monitor a time,
wherein the recognition module is further configured to detect an error if the recognition module is performing the recognition within a predetermined time slot and the result of the recognition does not correspond to the predetermined result that is expected.

5. The system according to claim 1, further comprising a communication module configured to transmit the input data to a controlling station if an error is detected.

6. The system according to claim 1,
wherein the system further comprises a plurality of error modules,
wherein each error module of said plurality of error modules is pre-trained for a recognition of a specific error,
wherein the system is configured to perform an error recognition by triggering the plurality of error modules sequentially.

7. The system according to claim 1, wherein the system is configured as a mobile apparatus.

8. The system according to claim 7,
wherein the mobile apparatus is a drone,
wherein the capturing device is a camera,
wherein the recognition module is a neuronal network pre-trained for recognizing at least one intact wind turbine based on at least one image captured by the camera,
wherein the monitoring device is further configured to monitor a location of the drone and an orientation of the camera,
wherein the recognition module is further configured to detect an error if the drone is within a predetermined region of the at least one intact wind turbine, the camera is oriented according to a predetermined orientation range with respect to the at least one intact wind turbine and the result of the recognition does not correspond to the predetermined result that is expected of the at least one intact wind turbine.

9. A method for examining at least one object for errors comprising:
monitoring, with a monitoring device, at least one parameter,
wherein the at least one parameter includes a location of the monitoring device,
wherein the at least one parameter is associated with a respective predetermined range representative of a situation where a predetermined result of a recognition of at least parts of the at least one object is expected,
comparing, with a processing module, a current value of the at least one parameter that has been monitored with the respective predetermined range,
determining, with the processing module, based on a result of the comparing, whether the current value of the at least one para meter that has been monitored is within the respective predetermined range,
when it has been determined that the current value of the at least one parameter that has been monitored is within the respective predetermined range, capturing input data,
performing, with a recognition module, a recognition of said at least parts of the at least one object based on the input data, wherein the recognition includes one or more of
  determining if said at least parts of said at least one object are present,
  determining proper operation of the at least one object within a specified time slot,
comparing, with the recognition module, a result of the recognition with the predetermined result that is expected corresponding to the respective predetermined range associated with the at least one parameter that has been monitored, and
detecting an error, with the recognition module, if the result of the recognition does not correspond to the predetermined result that is expected.

* * * * *